United States Patent [19]
Kohler

[11] Patent Number: 6,157,364
[45] Date of Patent: *Dec. 5, 2000

[54] PRESENTATION SYSTEM PROVIDING ALTERNATIVE PRESENTATION SEQUENCES

[75] Inventor: Timothy L. Kohler, Mountain View, Calif.

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,128

[22] Filed: Jan. 20, 1998

[51] Int. Cl.⁷ .................................................. G06T 11/00
[52] U.S. Cl. .......................................... 345/115; 345/356
[58] Field of Search ..................... 345/115, 117, 345/340, 345, 346, 339, 326, 336, 341–344, 353, 356, 357

[56] References Cited

U.S. PATENT DOCUMENTS

| | | |
|---|---|---|
| 5,125,734 | 6/1992 | Bridges .................................... 353/117 |
| 5,416,900 | 5/1995 | Blanchard et al. ...................... 395/155 |
| 5,469,192 | 11/1995 | Allen et al. .............................. 345/157 |
| 5,500,936 | 3/1996 | Allen et al. .............................. 395/156 |
| 5,526,011 | 6/1996 | Hix et al. ................................... 345/87 |
| 5,606,654 | 2/1997 | Schuur ..................................... 345/115 |
| 5,621,905 | 4/1997 | Jewson et al. .......................... 345/353 |
| 5,627,979 | 5/1997 | Chang et al. ........................... 345/335 |
| 5,630,125 | 5/1997 | Zellweger ................................ 395/614 |
| 5,644,776 | 7/1997 | DeRose et al. ......................... 395/761 |
| 5,668,966 | 9/1997 | Ono et al. ................................ 345/356 |

*Primary Examiner*—Steven Sax
*Attorney, Agent, or Firm*—Fitzpatrick, Cella, Harper & Scinto

[57] ABSTRACT

A method for defining a presentation tree for displaying a plurality of images includes creating a presentation tree structure having a plurality of branches, each branch being connected to a plurality of other branches by a branch node, each branch node having a plurality of branches descending therefrom, assigning at least one image of the plurality of images to each branch of the presentation tree structure, and defining a sequence control for each of the plurality of branches descending from a branch node, wherein a sequence control is defined for each branch node.

34 Claims, 13 Drawing Sheets

- Welcome ³¹
- Current Problem ³²
- Relevant Competitors ³⁴
- Industry Terms ³⁵
- General Market Structure ³⁶
- Market Synopsis ⁴²
- Our Strengths ³⁷
- General Strategy ³⁹
- Historical Trends ⁴⁴
- Detailed Strategy ⁴⁵
- Expected Results ⁴⁰
- Next Steps-General ⁴¹
- Next Steps-Detailed (1) ⁴⁶
- Next Steps-Detailed (2) ⁴⁷

- Welcome 31
- Current Problem 32
- Relevant Competitors 34
- Industry Terms 35
- General Market Structure 36
- Our Strengths 37
- General Strategy 39
- Expected Results 40
- Next Steps-General 41

FIG. 3A

- Welcome 31
- Current Problem 32
- Market Synopsis 42
- Our Strengths 37
- Historical Trends 44
- Detailed Strategy 45
- Expected Results 40
- Next Steps-Detailed 46

- Welcome ³¹
- Current Problem ³²
- Relevant Competitors ³⁴
- Industry Terms ³⁵
- General Market Structure ³⁶
- Our Strengths ³⁷
- Market Synopsis ⁴²
- General Strategy ³⁹
- Expected Results ⁴⁰
- Historical Trends ⁴⁴
- Detailed Strategy ⁴⁵
- Next Steps-General ⁴¹
- Next Steps-Detailed (1) ⁴⁶
- Next Steps-Detailed (2) ⁴⁷

FIG. 4

CURRENT PROBLEMS

- Decreasing Market Share In Current Products
- Lack Of New Products
- Aging Plant And Equipment

FIG. 10

CURRENT PROBLEMS

- Decreasing Market Share In Current Products
- Lack Of New Products
- Aging Plant And Equipment

FIG. 11

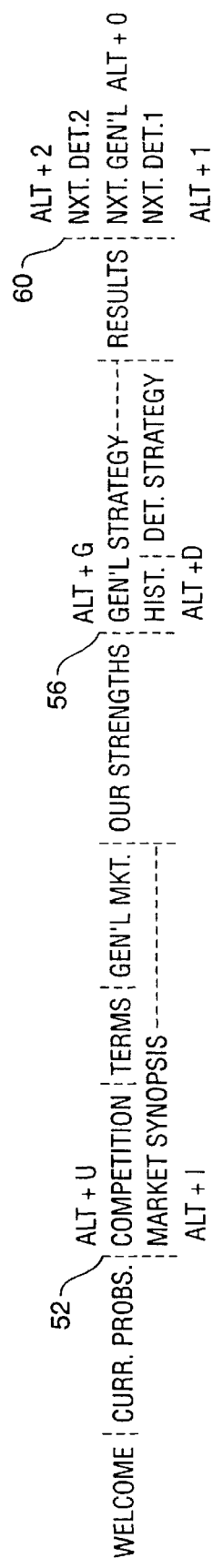
FIG. 12A
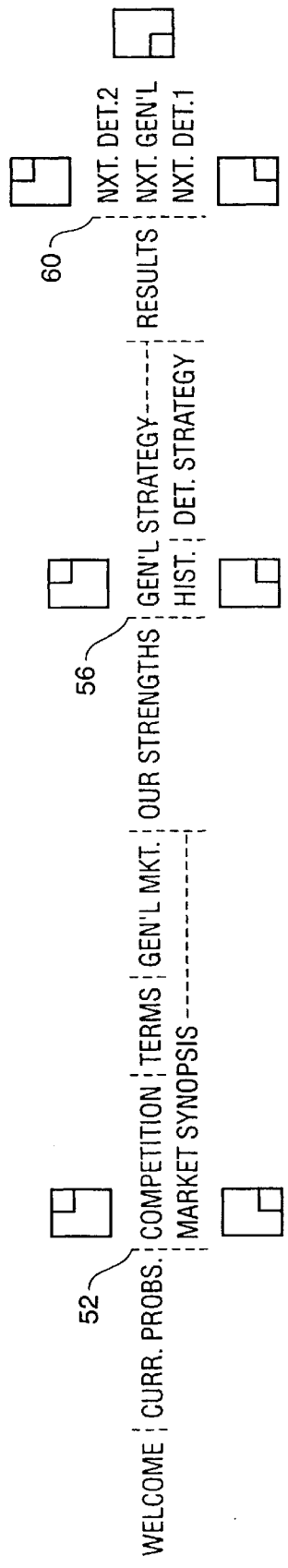
FIG. 12B
FIG. 12

PRESENTATION SYSTEM PROVIDING ALTERNATIVE PRESENTATION SEQUENCES

BACKGROUND OF THE INVENTION

1. Field of the Invention

The present invention relates to computerized presentation systems such as systems which provide a computerized slide or multi-media presentation. More particularly, the present invention concerns a computerized presentation system which allows changes to presentation sequences, such as by allowing selection from among plural different presentation sequences during the presentation itself.

2. Description of the Related Art

Visual aids have long been known as effective vehicles for conveying information to an audience. For example, exhibit boards, overhead projection of transparencies, and slide projections are all commonly used to assist in presentations. However, proceeding from one exhibit board, transparency, or slide to the next during a presentation disrupts presentation flow and, as a result, audience interest suffers.

To this end, computerized presentation systems, such as Microsoft PowerPoint, have been utilized to address the "disruption" problem. These systems allow a presenter to define and to store several image presentation sequences which can later be presented to an audience. During such a presentation, these systems interface to a conventional projection device so as to project images onto a display screen. A typical arrangement is illustrated in FIGS. 1 and 2, and includes portable-sized personal computer ("laptop") 2 and projector 7. Progression through a presentation sequence of images is controlled by depressing a key on a keyboard, a mouse button, or the like.

Unfortunately, these devices only provide a presenter with a capability to advance one image forward or one image backward through a predetermined presentation sequence As a result, a presenter cannot deviate from an initiated presentation sequence in response to feedback from his audience. Therefore, so as to account for differences in knowledge, experience, or attitudes of prospective audiences, a presenter must, in advance, define and store several alternative presentation sequences.

Even if several alternative presentation sequences are stored in advance, problems still arise. Consider, for example, a situation in which a presenter has anticipated an uninformed audience and has prepared a presentation sequence which includes many introductory images. If during the presentation the presenter realizes; that the audience is better informed than expected, his options are limited.

First, the presenter could stop the presentation, create a new presentation sequence tailored for the more sophisticated audience, and begin the new presentation sequence. Second, the presenter could stop the presentation and begin a previously-created presentation sequence tailored for the more sophisticated audience. Finally, the presenter could continue with the already-begun presentation sequence. In each of these cases, the presenter will likely lose the attention of the audience.

FIG. 3, comprising FIGS. 3A and 3B, illustrates two sample prior art slide presentation sequences. In this regard, the term "slide" is used herein to describe images, including animated and modifiable images, which are stored in a computer and projected onto a screen using conventional image hardware. However, it should be noted that the present invention may be used in conjunction with any type of presentation aid, including audio and multimedia aids.

The sample presentation sequences of FIGS. 3A and 3B are each intended to set forth a fictional company's current market position and plans for future action. Accordingly, the presentation sequences share common slides, such as slides 31, 32, 37 and 40. However, FIG. 3A shows a presentation sequence intended for a relatively uninformed audience. For example, the FIG. 3A sequence includes introductory slides 34 to 36, which describe relevant competitors, industry terms, and general market structure, respectively. Slides 39 and 41 of the FIG. 3A sequence also include general information.

In contrast, FIG. 3B illustrates a presentation sequence intended for a more informed audience. In this regard, the presentation sequence of FIG. 3B includes slides 45 and 46, which contain detailed information.

As described above, it is necessary for a presenter to define, in advance, both the FIG. 3A and FIG. 3B presentation sequences in order to prepare a presentation to an uninformed audience as well as a presentation to a more informed audience. However, in a case that a presenter initiates the FIG. 3A presentation sequence and subsequently determines that the FIG. 3B presentation sequence is more suitable to his audience, the presenter must either terminate the FIG. 3A presentation sequence and initiate the FIG. 3B presentation sequence, continue with the FIG. 3A sequence, or search, during the presentation, for appropriate slides to display. All of these options reduce the effectiveness of the presentation.

One proposed method to address the above problems is described in U.S. Pat. No. 5,469,192 to Allen et al. The system described therein allows a presenter to activate, during a presentation, a "pop-up" window upon laptop 2. The pop-up window provides a control panel for selecting several options, one of which is a "jump" option. Upon selection of the jump option, a second window is displayed which lists information corresponding to images available for display. The presenter then selects an appropriate image based on the listed information. Next, the selected image is displayed.

Although the above system allows a presenter to diverge from a predetermined presentation sequence, the presenter must execute several time-consuming steps in order to do so. This approach is extremely disruptive to the continuity of a presentation. Accordingly, because a slide presentation relies on continuity as a means for holding audience attention, the disruptions resulting from the system described in Allen reduce the effectiveness of the presentation.

Therefore, what is needed is an improved presentation system which allows a presenter to define a presentation sequence containing several alternative sequences, to select from the several alternative sequences while progressing through the presentation sequence, and which allows such selectability without causing significant disruption of the presentation.

SUMMARY OF THE INVENTION

The present invention addresses the foregoing by providing a system for creating a presentation tree representing alternative presentation sequences. The present invention also provides a system for proceeding through one of the alternative sequences during a presentation without causing significant disruption of the presentation. As a result, the present invention allows a presenter to switch smoothly from one presentation sequence to another during a presentation.

Accordingly, in one aspect, the present invention is a system to define a presentation tree for displaying a plurality of images, the system including creation of a presentation tree having a plurality of branches, each branch being connected to a plurality of other branches by a branch node, and each branch node having a plurality of branches descending therefrom, assignment of at least one image of the plurality of images to each branch of the presentation tree, and definition of a sequence control corresponding to each of the plurality of branches descending from a branch node, wherein the definition of a sequence control is performed for each branch node in the presentation tree structure.

By virtue of the foregoing, a presenter is able to select from two or more predefined alternative sequences within a single presentation tree during execution of the presentation tree. In contrast, conventional presentation systems do not allow a presenter to define a single presentation tree having several alternative presentation sequences, and therefore do not allow navigation among the alternative sequences using predefined sequence control.

In a related aspect, the present invention provides a system to create a presentation tree for displaying a plurality of images in which a graphical user interface is displayed, user manipulations of the graphical user interface are received, and, in response to the user manipulations, a presentation tree is created, the presentation tree having a plurality of branches, each branch being connected to a plurality of other branches by a branch node, each branch node having a plurality of branches descending therefrom. Moreover, each of the plurality of branches is associated with at least one of the plurality of images.

The above-described presentation tree allows a presenter to select from two or more predefined alternative sequences during execution of the presentation tree. Conventional presentation systems, however, do not allow a presenter to create a presentation tree and do not provide on-the-fly selection of alternative presentation sequences.

The present invention also concerns a user interface for creating a presentation tree. The interface includes a workspace for defining alternative presentation sequences of a presentation tree, the presentation tree having a plurality of branches, each branch being connected to a plurality of other branches by a branch node, each branch node having a plurality of branches descending therefrom. The interface also includes controls for defining a sequence control for each of the plurality of branches.

A graphical user interface according to the invention allows a presenter to define a presentation tree having alternative presentation sequences. As a result, the presenter can utilize the tree to execute several alternative presentation sequences. Conventional presentation systems, on the other hand, do not provide user interfaces having such capabilities.

In another aspect, the present invention is a system to control presentation flow through a presentation tree defined by a plurality of branches, each branch being connected to a plurality of other branches by a branch node, each branch node having a plurality of branches descending therefrom, and each branch having assigned thereto at least one presentation image. The system includes display of each presentation image assigned to one branch of the tree, the one branch connected to a branch node, execution of a sequence control to select one of a plurality of branches descending from the branch node, and display of each presentation image assigned to the selected one branch.

By providing a system to control presentation flow through a presentation tree using a sequence control, the present invention also provides for presentations which are both continuous and adaptable to various audiences and occasions.

In contrast, conventional systems do not utilize a presentation tree having alternative sequences. Therefore, continuous and adaptable presentations are difficult to achieve using these systems.

In a related aspect, the present invention is a system for displaying a presentation sequence of a plurality of images in which a command to initiate a presentation sequence is received and a plurality of images are displayed sequentially in accordance with a presentation tree having a plurality of branches, each branch being connected to a plurality of other branches by a branch node, each branch node having a plurality of branches descending therefrom. Preferably, each of the plurality of images is assigned to at least one of the plurality of branches.

According to this aspect, the present invention displays one of several alternative presentation sequences defined by a presentation tree. This feature allows a presenter to define a single presentation tree for use in displaying several presentation sequences. In contrast, conventional systems require a presenter to define several linear presentation sequences.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 3, comprising FIGS. 3A and 3B, illustrates two prior art image presentation sequences.

FIG. 4 illustrates a presentation tree having alternative sequences according to the present invention.

FIG. 10 is a view of a displayed presentation image according to one embodiment of the present invention.

FIG. 11 is a view of a displayed presentation image according to a second embodiment of the present invention.

FIG. 12, comprising FIGS. 12A and 12B, shows two versions of a presentation flow tool according to the present invention.

DETAILED DESCRIPTION OF THE PREFERRED EMBODIMENTS

Figure 1:
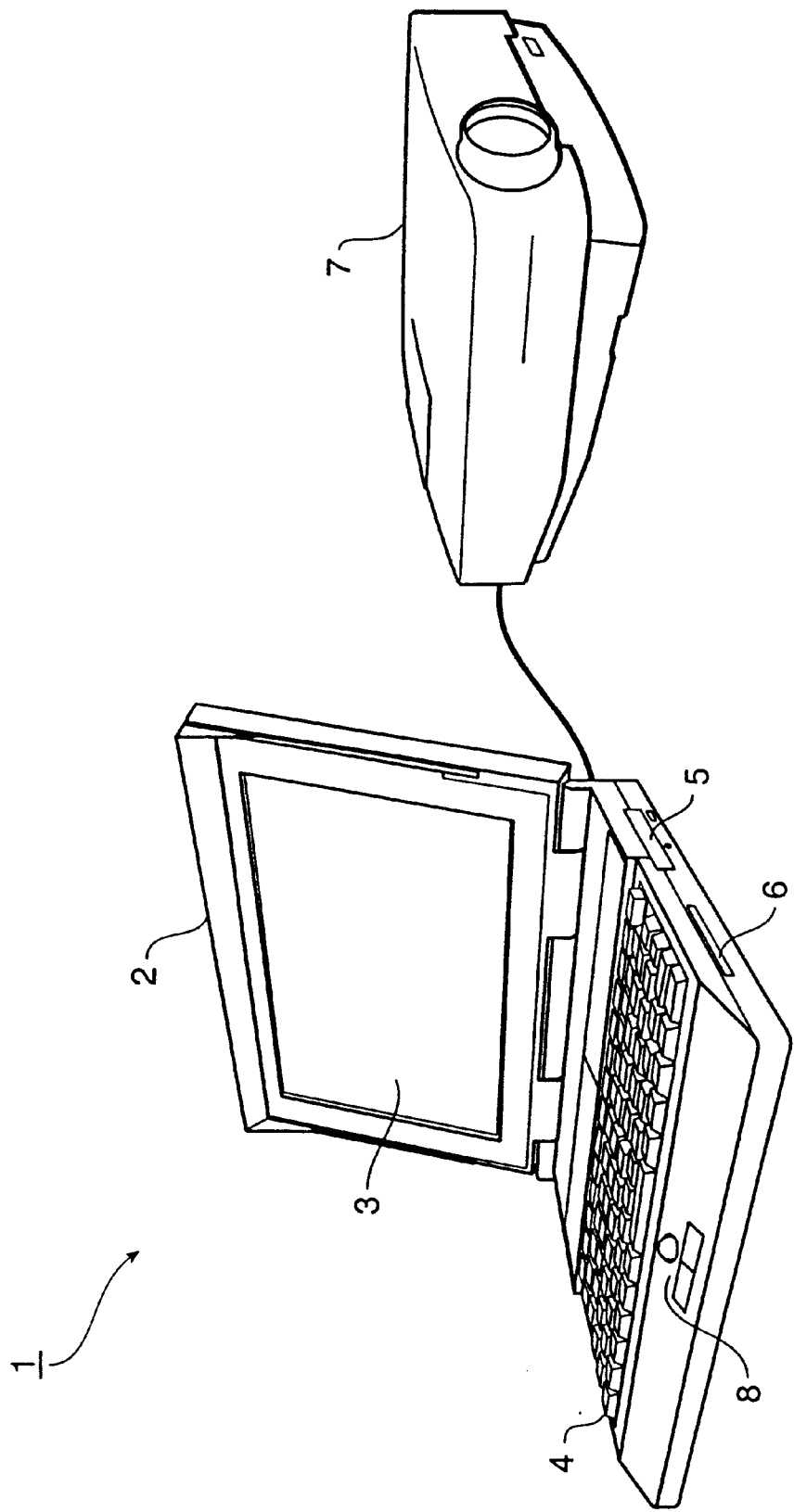
FIG. 1 is a view showing an outward representation of a computing system embodying the present invention.

FIG. 1 is a view showing an outward appearance of computing equipment used in connection with the present invention. Computing equipment 1 includes laptop 2, preferably an IBM PC-compatible computer having a windowing environment, such as Microsoft™ Windows95. Provided with laptop 2 are display screen 3 comprising an active-matrix color display or the like, keyboard 4 for entering text data and user-commands, and pointing device 8. Pointing device 8 preferably comprises a trackball with plural buttons corresponding to right and left mouse buttons, and is used for pointing to and for manipulating objects displayed on display screen 3.

Laptop 2 also includes a computer-readable memory medium, such as a floppy disk stored within floppy disk drive 5, and fixed computer disk 6. Floppy disk drive 5 provides means whereby laptop 2 can access information, such as data, application programs, etc., stored on floppy disks. A similar CD-ROM interface (not shown) may be provided within computing equipment 1, through which laptop 2 can access information stored on CD-ROMs.

Disk 6 stores, among other things, application programs by which laptop 2 generates files, manipulates and stores those files on disk 6, and presents data in those files to an operator via display screen 3. Disk 6 also stores an operating system which, as noted above, is preferably a windowing operating system such as Windows95. Device drivers are also stored in disk 6 for communicating with display screen 3, and with other peripherals.

Projector 7 is connected to laptop 2 and is used to project stored presentation images upon a projection screen, wall, or the like. Projector 7 is be a projection device which interfaces as a second display screen to laptop 2. Alternatively, projector 7 may comprise a conventional overhead projector having an electronic overlay device placed thereon, with the overlay device interfaced to laptop 2. Preferably, images projected by projector 7 are simultaneously displayed on display screen 3 to allow a presenter to confirm that a correct image is being projected and to facilitate execution of sequence control, which is described in detail below.

During a presentation, and under control of the windowing operating system, the presentation application program is executed to display a sequence of presentation images to an audience via projector 7 and, in order to provide control over the presentation, to display simultaneously the sequence of images to a presenter via a screen 3.

Figure 2:
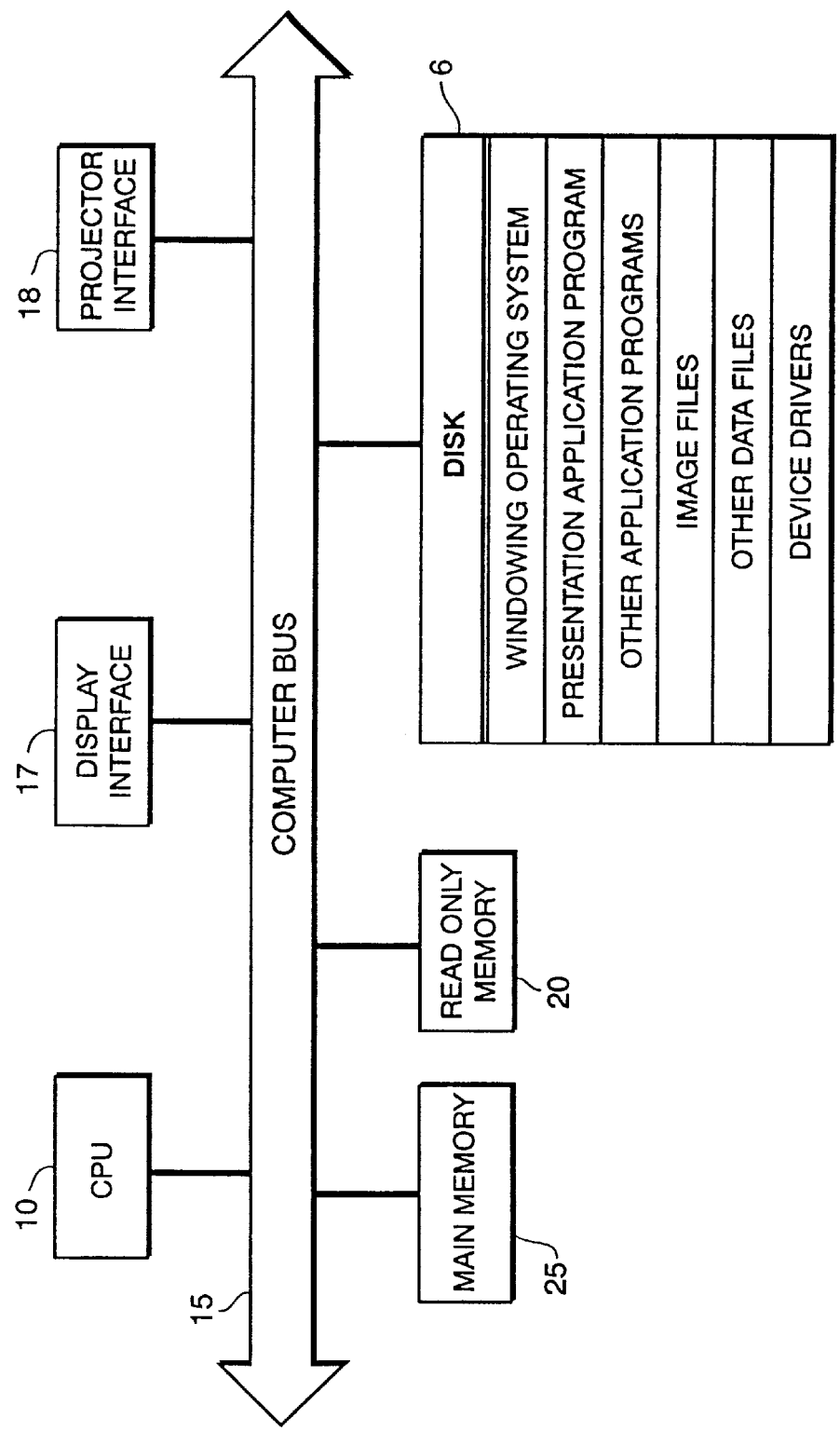
FIG. 2 is a block diagram of the internal architecture of the FIG. 1 computing system.

FIG. 2 is a detailed block diagram showing the internal architecture of computing equipment 1. As shown in FIG. 2, computing equipment 1 includes a central processing unit (CPU) 10, such as a programmable microprocessor for executing computer-executable process steps, interfaced to computer bus 15. Also interfaced to computer bus 15 are display interface 17 and projector interface 18.

Read only memory (ROM) 20 is interfaced to computer bus 15 and stores invariant instruction sequences such as start-up instruction sequences or basic input/output operating system. (BIOS) sequences for operation of keyboard 4.

Main memory 25, such as a random access memory (RAM), is also interfaced to computer bus 15 so as to provide CPU 10 with access to memory storage. In particular, when executing stored application program instruction sequences or other computer-executable process steps, CPU 10 loads those instruction sequences from disk 6 (or other storage media, such as a floppy disk or CD-ROM, or from a network or the World Wide Web) into main memory 25 and executes these sequences or steps out of main memory 25.

As also shown in FIG. 2, and as previously-noted, fixed disk 6 stores program instruction sequences for a windowing operating system and for various application programs such as a presentation application program and the like. In addition, stored on fixed disk 6 are image files such as those displayed by a presentation application program according to the present invention. These files may be created by the above-mentioned presentation application or received from an outside source. Fixed disk 5 also stores device drivers for communication with the various peripherals.

FIG. 4 represents a presentation tree according to the present invention. The tree shown in FIG. 4 incorporates both presentations shown in FIG. 3. In order to more fully describe the benefits of the invention, the FIG. 4 tree also includes slide 47, which is not present in either the FIG. 3A or FIG. 3B sequences. As described in more detail below, upon display of common slides 32 or 37, a presenter may choose one of two alternative sequences through which the presentation will proceed. Similarly, upon display of common slide 40, a presenter may choose one of three alternative sequences. Accordingly, use of a tree such as the FIG. 4 tree enables a presenter to easily select from alternative presentation sequences during a presentation.

Figure 5:
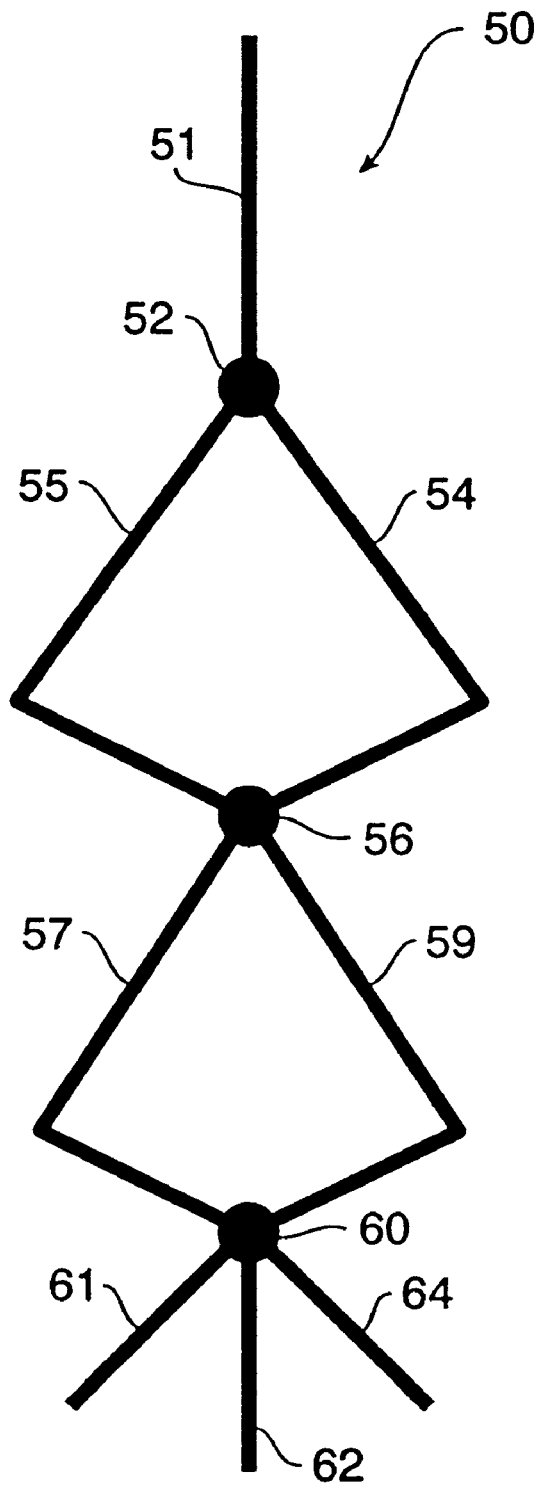
FIG. 5 is a conceptual representation of the FIG. 4 presentation tree.

FIG. 5 shows a conceptual representation of the FIG. 4 tree for purposes of more clearly defining the terms used hereinbelow. As shown in FIG. 5, presentation tree 50 includes a plurality of branches, with each branch, such as branch 51, being connected to a plurality of other branches, such as branches 54 and 55, by a branch node such as branch node 52. Each other branch node in tree 50, specifically branch node 56 and branch node 60, has a plurality of branches descending therefrom. In the case of branch node 56, branches 57 and 59 descend therefrom, while branches 61, 62, and 64 descend from branch node 60.

Tree 50 reflects the FIG. 4 presentation tree as follows. Slide 31 is assigned to branch 51 of tree 50 and slide 32 is assigned to branch node 52. Similarly, slide 42 is assigned to branch 54, slides 34 to 36 are assigned to brarch 55, and slide 37 is assigned to branch node 56. Slides 44 and 45 are assigned to branch 59, slide 39 is assigned to branch 57, and slide 40 is assigned to node 60. Finally, slides 41, 46, and 47 are assigned, respectively, to branches 61, 62, and 64. Construction of a presentation tree according to the preferred embodiment of the invention will be described below with respect to FIGS. 6 to 8.

Figure 6:
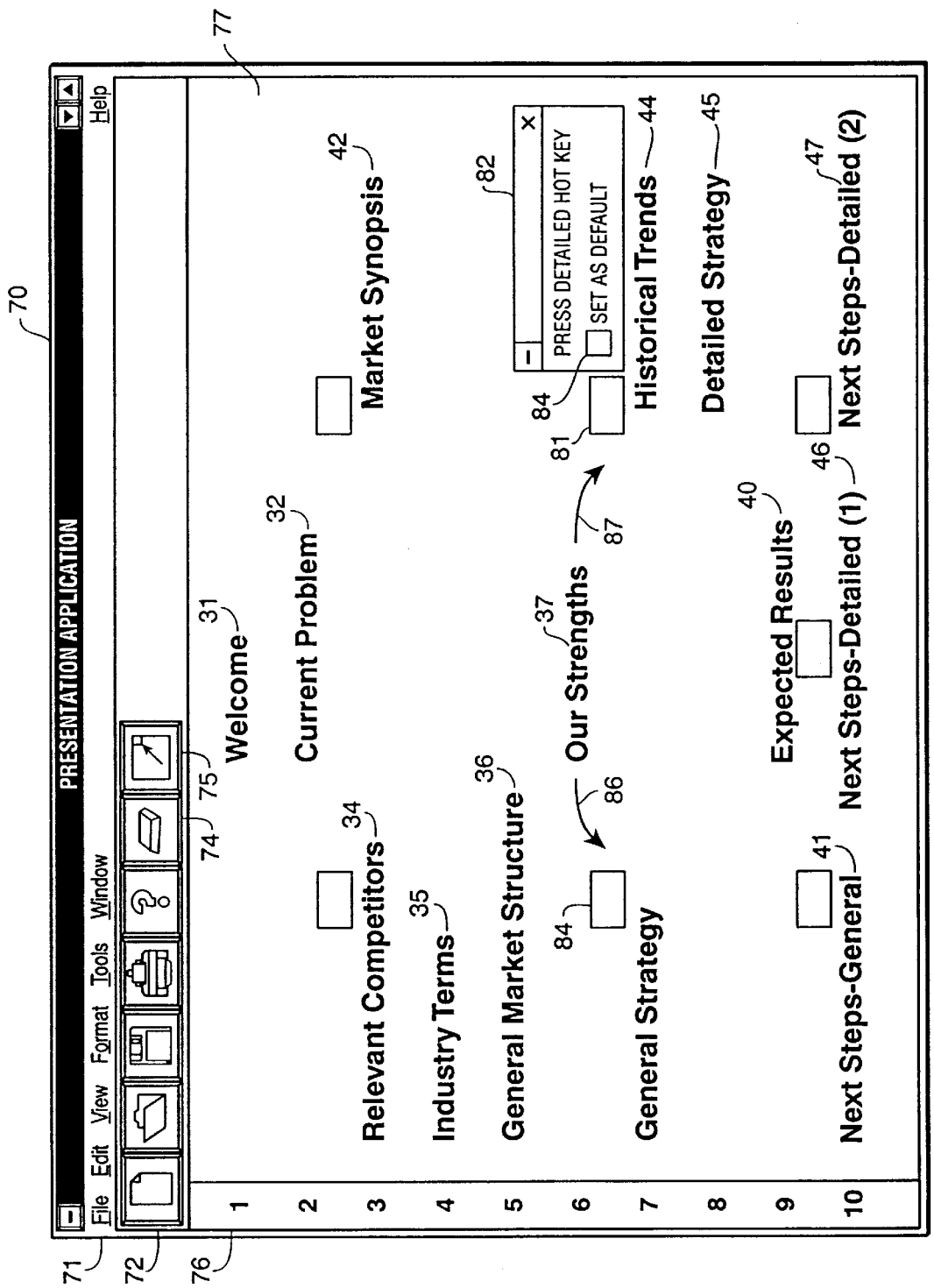
FIG. 6 is a view of a displayed graphical user interface for creating a presentation tree according to the present invention.

FIG. 6 shows a graphical user interface for creating a presentation tree in accordance with the present invention. In particular, FIG. 6 shows main window 70 of a presentation application program according to the present invention. Main window 70 includes tool bar 71, from which several pull-down menus providing access tc various functions may be accessed. Also within window 70 is icon bar 72, in which are displayed icons representative of regularly-used functions. Each function represented in icon bar 72 may also be executed via a pull-down menu accessed through tool bar 71. Advantageously, icon bar 72 includes icon 74 and icon 75. Icon 74 corresponds to an "add hot-key" function and icon 75 corresponds to an "add hot-corner" function. Details of these functions will be described in more detail below.

Position indicator 76 indicates a position in a presentation tree at which a particular slide is displayed. The particular slides are entered into workspace 77 according to their title. For example, presentation slide 31, entitled "Welcome" is entered into a position in workspace 77 corresponding to numeral "1" within position indicator 76. Accordingly, "Welcome" slide 31 is a first slide in a presentation tree defined within workspace 77. Similarly, since slide 36 is located at position "5" and slide 35 is located at position "4", slide 36 is displayed after slide 35. Other slides are also entered into workspace 77 so as to construct presentation tree 50.

It should be noted that the positions of slides entered into workspace 77 correspond directly to the locations of those slides in presentation tree 50. For example, slides 34 to 36 correspond to branch 55, and slides 44 and 45 correspond to branch 59. Moreover, the positions of slides in workspace 77 indicate which slides to the various branch nodes of tree 50. In this regard, slide 37 immediately precedes both slides 39 and 44, and therefore corresponds to branch node 56.

As shown, more than one slide may be entered on a line corresponding to a numeral in position indicator 76. In this case, a sequence control indicator, such as indicators 81 and 84, is displayed above each slide in the line in order to indicate that a sequence control should be defined for each slide in the line.

A defined sequence control, which consists either of a hot-key sequence or a hot-corner selection, is used by a presenter to select one of alternative presentation sequences during a presentation. For example, upon reaching slide 37 (node 56 of FIG. 5), a presenter must select between a sequence indicated by arrow 86 or a sequence indicated by arrow 87. In order to select sequence 87, for example, the presenter executes the sequence control defined for sequence 87 (branch 59 of FIG. 5) and indicated by sequence control indicator 81.

Dialog box 82 is displayed during definition of sequence control, which is described in more detail below. As shown, dialog box 82 contains check box 84, which indicates whether a sequence corresponding to dialog box: 82 should be utilized as a default sequence. A default sequence is a sequence which, during execution of a presentation tree, is automatically selected upon reaching a node in a presentation tree. Execution of a presentation tree is also described in more detail below.

Figure 7:
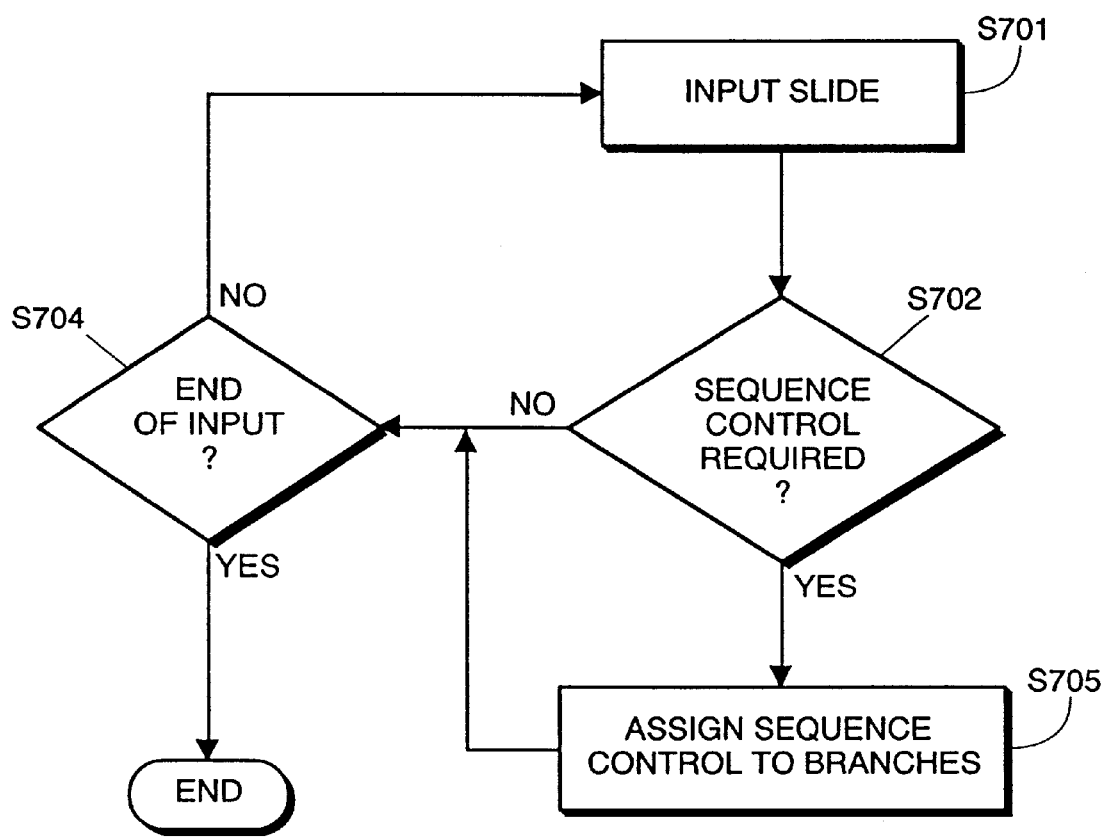
FIG. 7 is a flow diagram describing user creation of a presentation tree according to the present invention.

FIG. 7 is a flow diagram for describing creation of a presentation tree according to the invention. The presentation tree i:s defined in advance of presentations, so as to allow the presenter to select different branches of the tree during a presentation. Briefly, a method for defining a presentation tree for displaying a plurality of images includes the steps of creating a presentation tree having a plurality of branches, each branch being connected to a plurality of other branches by a branch node, each branch node having a plurality of branches descending therefrom, and at least one image of the plurality of images being assigned to each branch of the presentation tree. The method also includes defining, for each branch node in the presentation tree, a sequence control corresponding to each of the plurality of branches descending from the branch node.

More specifically, in step S701, a presenter inputs a slide into workspace 77 shown in FIG. 6. In step S702, the presenter determines whether a sequence control need be defined corresponding to the slide input in step S701. If not, flow proceeds to step S704 wherein the presenter determines whether to input additional slides into workspace 77. If so, flow returns to step S701. If not, flow terminates. If the determination in step S702 is affirmative, flow continues to step S705, wherein the required sequence controls are defined.

For example, in a case that the slide input in step S701 is the second slide input onto line "3" in workspace 77, it is determined in step S702 that two sequence controls must be defined. One of the two sequence controls is defined for the second-input slide and the other control is defined for the slide first input onto line "3".

One preferred method for defining a sequence control proceeds as follows. First, a sequence control indicator such as indicator 81 is selected. Next, either icon 74 or icon 75 is selected, depending on whether a presenter wishes to assign a hot-key sequence control or a hot-corner sequence control. After selecting one of the icons, dialog box 82 is displayed. Dialog box 82 instructs a presenter to execute a desired hot-key or a desired hot-corner depending on which of icons 74 or 75 is selected. In the case shown in FIG. 6, icon 74 is selected, resulting in display of a "press desired hot-key" instruction within dialog box 82.

Alternatively, icon 74 and icon 75 may be used as toggles between a "define hot-key" mode and a "define hot-corner" mode. In this case, an appropriate corresponding dialog box is immediately displayed upon selection of sequence control indicator 81. It should be understood that, due to the foregoing, hot-corners may be utilized instead of hot-keys, or both hot-corners and hot-keys may be utilized in a single presentation tree.

It should also be noted that, although FIG. 6 shows a graphical user interface according to the present invention, a presentation tree structure according to the present invention may be created using other interactive methods. One possibility is a system in which separate linear presentation sequences are input and a tree structure is automatically constructed based on common elements of the separate sequences, such as common slides 31, 32, 37, and 40. Another possibility is a system in which a diagram such as that shown in FIG. 5 is first constructed, and slides and sequence controls are then assigned to the various branches and branch nodes. Moreover, three-dimensional displays may be utilized in order to allow more complex relationships between several alternative sequences within a single presentation tree.

Figure 8:
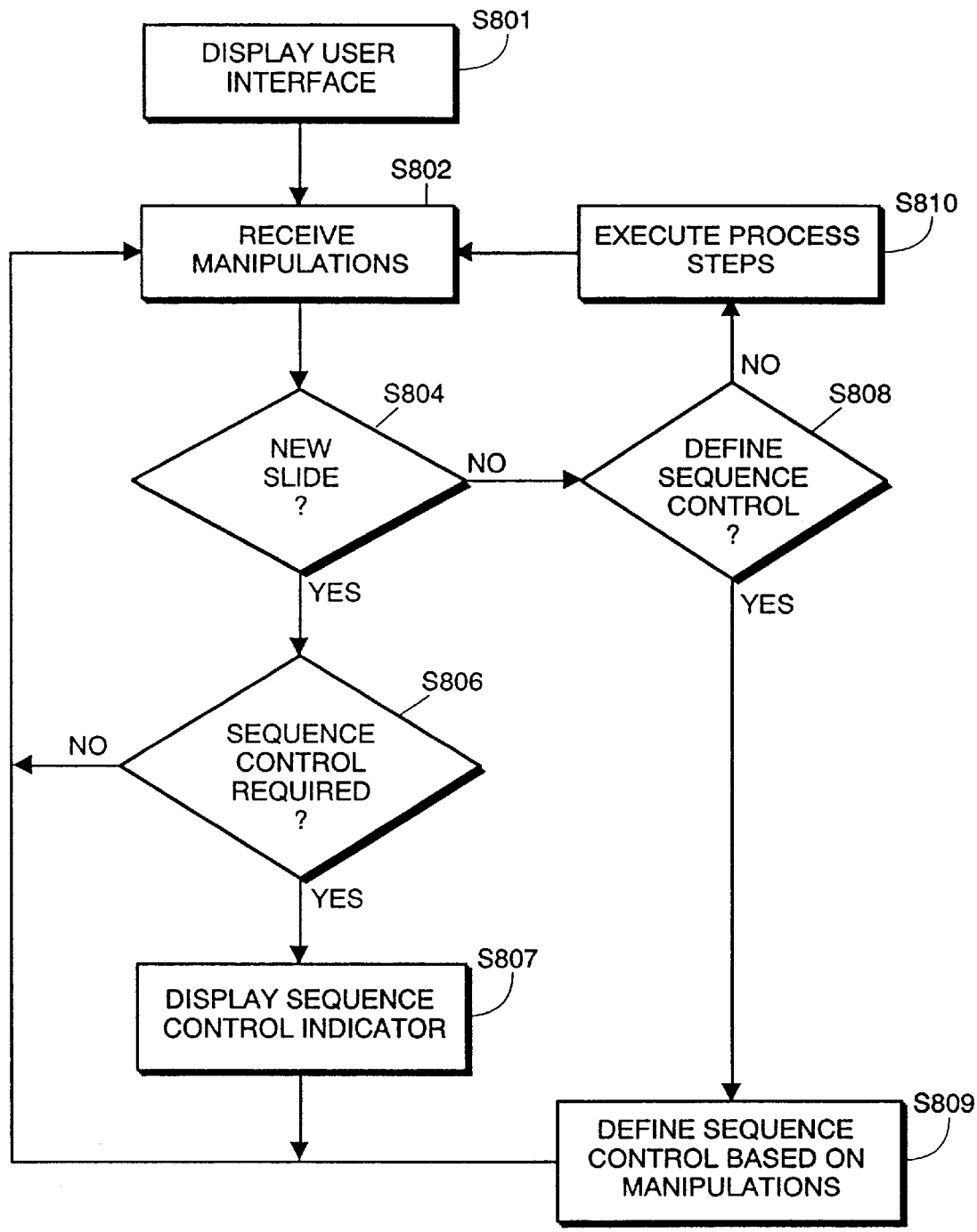
FIG. 8 is a flow diagram describing computer-executable process steps for creating a presentation tree according to the present invention.

FIG. 8 is a flow diagram for describing computer-executable process steps performed by CPU 14 during creation of a presentation tree according to the present invention. In brief, the computer-executable process steps include code 1) to display a graphical interface, 2) to receive user manipulations of the graphical user interface, 3) to create, in response to the user manipulations, a presentation tree having a plurality of branches, each branch being connected to a plurality of other branches by a branch node, with each branch node having a plurality of branches descending therefrom, and 4) to assign at least one of the plurality of images to each of the plurality of branches. Preferably, the presentation steps also include code to determine whether or not a manipulation is an instruction to assign a sequence control to a branch, and to assign a sequence control to a branch in a case that it is determined that a manipulation is an instruction to assign a sequence control to a branch.

The flow of FIG. 8 begins at step S801, in which a graphical user interface such as user interface 70 is displayed to a user. User manipulations of user interface 70 are received in step S802. Next, in step S804, it is determined whether the received user manipulations correspond to an instruction to input a new slide onto a line in workspace 77. If so, flow proceeds to step S806 in which process steps are executed by CPU 14 to determine whether a sequence control is required based on the instruction to input a new slide. As described above, this determination is based on whether a slide already exists on the line of workspace 77. If so, flow proceeds to step S807 in which sequence control indicators are displayed where required. For example, entry of slide 44 after entry of slide 39 into workspace 77 causes sequence control indicators 81 and 84 to be displayed in step S807. After step S807, flow returns to step S802.

If, in step S804, it is determined that the manipulations received in step S802 do not correspond to an instruction to input a new slide, flow continues to step S808 in which it is determined whether the received manipulation corresponds to an instruction to define a sequence control. As described above, either selection of sequence control indicator 81 or icons 74 or 75 may be interpreted as an instruction to define a sequence control. If the determination in step S808 is affirmative, flow proceeds to step S809, in which process steps are executed in order to define a sequence control to a particular branch of a presentation tree in accordance with the manipulations.

For example, in a case that sequence control indicator 81 is selected in step S802, flow proceeds to step S804, step S808, and step S809. In step S809, dialog box 82 is displayed, containing text corresponding to icon 74 if icon 74 is depressed, or corresponding to icon 75 in a case that icon 75 is depressed. As described above, either a hot-key sequence or a hot-corner sequence is executed, which is received by PC 2 in order to define a sequence control corresponding to sequence 87 (branch 59 of tree 50).

To execute a hot-key sequence, a presenter presses keys on keyboard 6 corresponding to a defined hot-key sequence. To execute a hot-corner, a presenter moves a pointer to an assigned corner of a displayed slide. Of course, the assigned location need not be a corner of the displayed slide, but may be any position on the displayed slide. Moreover, a presenter may also be required to "click" on the assigned location in order to execute the hot-corner.

Returning to the FIG. 8 flow, if the determination in step S808 is negative, flow continues to step S810 wherein other process steps are executed in accordance with the manipulation received in step S802. Examples of such process steps are steps to open a file, to close a file, to save a file, to turn selected slides, or to execute a presentation sequence.

Figure 9:
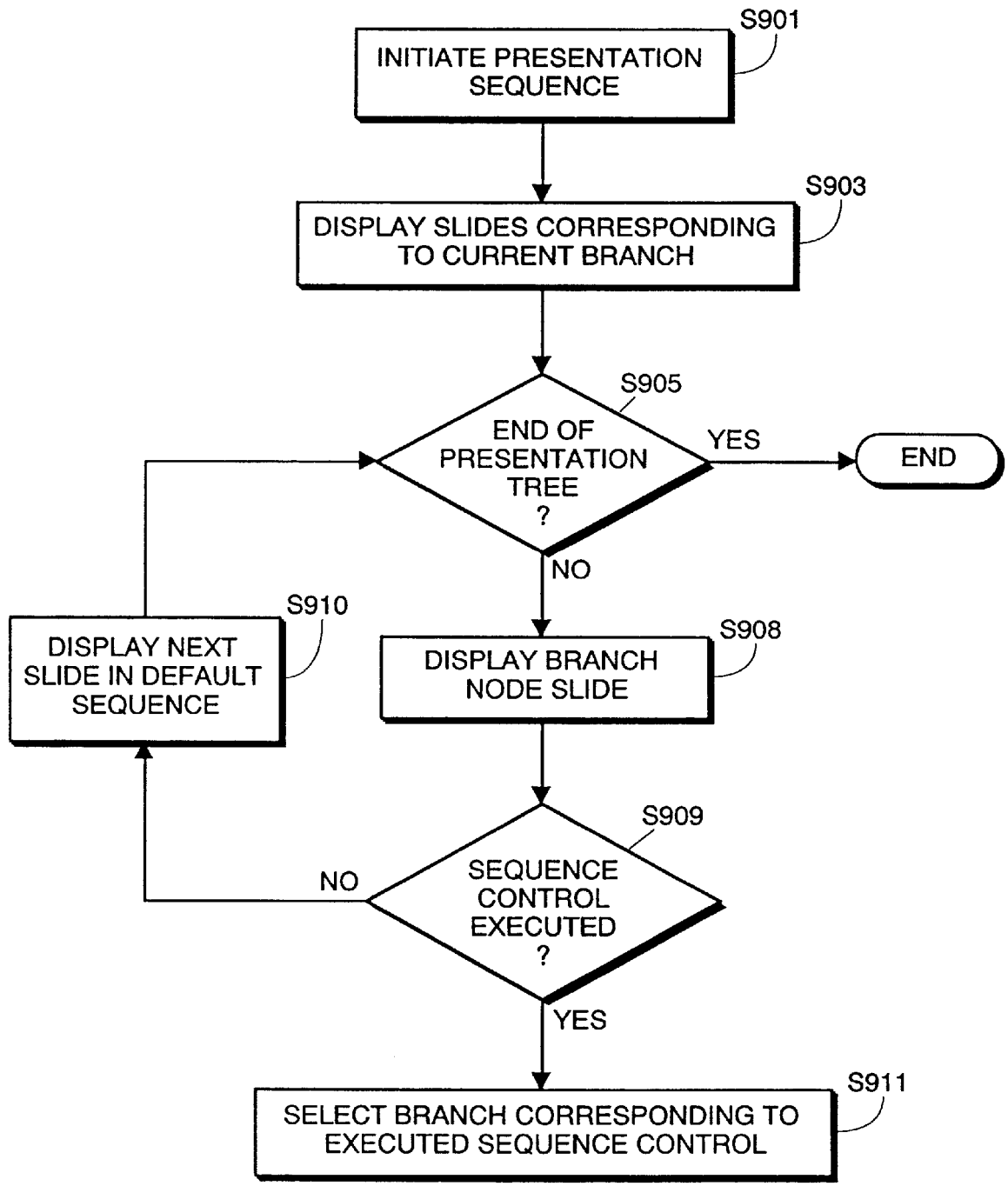
FIG. 9 is a flow diagram describing execution of a presentation sequence according to the present invention.

FIG. 9 is a flow diagram describing a method for controlling presentation flow through a presentation tree defined by a plurality of branches, each branch being connected to a plurality of other branches by a branch node, each branch node having a plurality of branches descending therefrom, and each branch having assigned thereto at least one presentation image. The method includes displaying each presentation image assigned to one branch of the tree, the one branch connected to a branch node, executing a sequence control to select one of a plurality of branches descending from the branch node, and displaying each presentation image assigned to the selected one branch.

More specifically, in step S901, a presenter issues a command to initiate a presentation sequence. Next, in step S903, each slide corresponding to an initial branch of the tree is displayed. The slides are displayed in step S903 in the order in which they are assigned to their corresponding branch. For example, with respect to slide 34 to 36 of branch 55, slide 34 is initially displayed, followed by slides 35 and 36. A presentation application according to the present invention preferably allows a user to select a time duration during which a slide is displayed prior to display of a subsequent slide.

Flow then proceeds to step S905, in which flow terminates if it is determined that the end of the presentation tree has been reached. Otherwise, it is assumed that a branch node has been reached. Accordingly, in step S908, a slide corresponding to the reached branch node is displayed.

In step S909, it is determined whether a sequence control has been executed by the presenter. If not, flow proceeds to step S910, in which the next slide in the default sequence corresponding to the reached node is executed. As discussed above with respect to FIG. 6, the default sequence is dictated by selection of "set as default" check boxes, such as check box 84, which correspond to a each sequence descending from a branch node in a presentation tree. For example, upon reaching slide 37 (node 56 of FIG. 5), it is determined whether a control sequence has been executed. If not, and if box 84 is checked, flow proceeds to step S910, wherein slide 44 is displayed. Flow then returns to step S905.

If, in step S909, a sequence control is executed, flow proceeds to step S911, wherein the next slide in a branch corresponding to the executed sequence control is displayed.

It should be noted that only a presentation slide is projected to an audience during the above-mentioned loop between steps S905 and S910. An example of such a projected slide is shown in FIG. 10. simultaneously, screen 3 shows both the projected slide and other information, such as a "sequence control needed" indicator or the like, to the presenter. Accordingly, upon execution of a hot-key sequence control and resulting progression to step S911, a subsequent slide is immediately displayed. Advantageously, this procedure does not significantly disrupt the flow of a presentation.

In this regard, FIG. 11 shows an alternative method for projecting a slide at steps S907 to S909 before and during execution of a hot-corner sequence control. As shown in FIG. 11, pointer 90 is projected along with the presentation slide. As described above with respect to FIG. 10, the FIG. 11 image is also displayed on screen 3 along with other presentation information.

Since pointer 90 is most Likely used during the presentation in order to point out various features of displayed presentation slide, selection of a hot-corner sequence control using such a pointer should not cause significant visual disruption of the presentation. Of course, pointer 90 may also be projected during a presentation sequence utilizing hot-key sequence control.

It should also be noted that, according to the invention, a slide need not be assigned to each, or any, branch node in a presentation tree. In this case, upon reaching step S908, the currently-displayed slide is displayed. By virtue of this feature, alternative presentation sequences in such a presentation tree need not share common slides.

Due to anticipated difficulty in recalling each defined sequence control in a presentation tree, the present invention also provides for a presentation flow tool for describing each sequence control in a presentation tree. In this regard, FIG. 12, comprising FIGS. 12A and 12B, shows presentation flow tools produced by a presentation application according to the present invention. In particular, after defining a presentation tree, a presenter may instruct a presentation application to display such a tool on display screen 3 in order to provide a quick reference for controlling a presentation sequence according to the invention. As shown in FIG. 12A, hot-key designations are displayed adjacent to slides following branch nodes 52, 56, and 60. FIG. 12B shows a similar presentation flow tool to be used in conjunction with hot-corner sequence control. According to another aspect of the invention, a presenter may instruct a presentation application to print a hardcopy version of a presentation flow tool also for use as a quick reference. Of course, other forms of presentation tools may be used in practicing the present invention.

Figure 13:
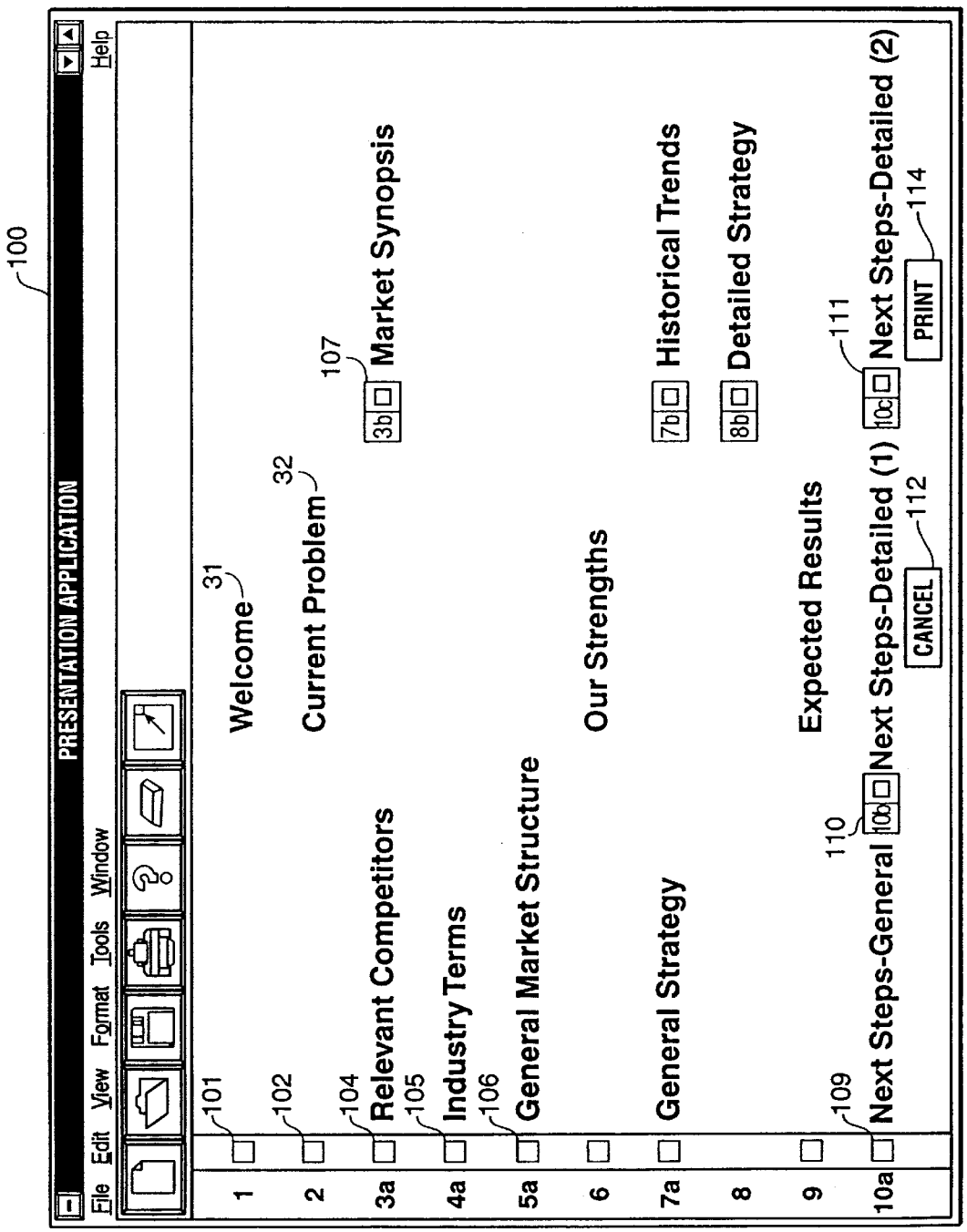
FIG. 13 is a view of a displayed graphical user interface for selecting a sequence of images to be printed in accordance with the present invention.

The present invention also provides a convenient method for printing images corresponding to a particular sequence of a presentation tree. For example, FIG. 13 shows graphical user interface 100 for indicating which slides in a presentation tree are to be printed. As shown in the Figure, check boxes 101 and 102 Correspond to common slides 31 and 32 and are therefore denoted by numerals "1" and "2", respectively. In contrast, check boxes 104 to 106 and 107 reflect slides of alternative presentation sequences and are therefore denoted by letters "a" and "b", respectively. Along these lines, slides 44, 46, and 47, which represent three alternative sequences, are distinguished from one another using letters "a", "b", and "c".

In use, a presenter selects check boxes from interface 100 which correspond to desired slides and then selects "PRINT" icon 114 to print the slides using printer 10. Advantageously, a presenter may print the slides on transparency sheets in order to prepare a manual presentation. "CANCEL" icon 112 allows a user to exit interface 100 without printing any slides.

While the present invention is described above with respect to what is currently consider its preferred embodiment, it is to be understood that the invention is not limited to that described above. To the contrary, the invention is intended to cover various modifications and equivalent arrangements includes within the spirit and scope of the appended claims.

What is claimed is:

1. A method for defining a presentation tree for displaying a plurality of images, the method comprising the steps of:

creating a presentation tree structure including elements that correspond to images of a multimedia presentation, the elements comprising a plurality of branches and at least one branch node, each branch being connected to a plurality of other branches by a branch node, each branch node having a plurality of branches descending therefrom;

assigning at least one image of the plurality of images to each branch of the presentation tree structure; and defining a sequence control for each of the plurality of branches descending from a branch node, wherein said defining step is performed for each branch node.

2. A method according to claim 1, further comprising displaying a quick reference presentation flow tool illustrating each sequence control for each branch of the presentation tree.

3. A method according to claim 2, further comprising printing the quick reference presentation flow tool.

4. A method for controlling presentation flow through a presentation tree including elements that correspond to images of a multimedia presentation, the elements comprising a plurality of branches and at least one branch node, each branch being connected to a plurality of other branches by a branch node, each branch node having a plurality of branches descending therefrom, and each branch having assigned thereto at least one presentation image, comprising:

displaying each presentation image assigned to one branch of the tree, the one branch connected to a branch node;

executing a sequence control to select one of a plurality of branches descending from the branch node; and displaying each presentation image assigned to the selected one branch.

5. A method according to claim 4, wherein, during the executing step, only a presentation image and a pointer are displayed.

6. A method according to claim 4, wherein, during the executing step, only a presentation image is displayed.

7. A computer-readable medium storing computer-executable program code to create a presentation sequence of a plurality of images, the code comprising:

code to display a graphical user interface;

code to receive user manipulations of the graphical user interface;

code to create, in response to the user manipulations, a presentation tree including elements that correspond to images of a multimedia presentation, the elements comprising a plurality of branches and at least one branch node, each branch being connected to a plurality of other branches by a branch node, each branch node having a plurality of branches descending therefrom;

code to assign at least one of the plurality of images to each of the plurality of branches; and code to assign a sequence control for each branch node.

8. A computer-readable medium according to claim 7, further comprising code to display a quick reference presentation flow tool illustrating each sequence control for each branch of the presentation tree.

9. A computer-readable medium according to claim 8, further comprising code to print the quick reference presentation flow tool.

10. A computer-readable medium storing computer-executable program code to display a presentation sequence of a plurality of images, the code comprising:

code to receive a command to initiate a presentation sequence;

code to display sequentially a plurality of images in accordance with a presentation tree including elements that correspond to images of a multimedia presentation, the elements comprising a plurality of branches and at least one branch node, each branch being connected to a plurality of other branches by a branch node, each branch node having a plurality of branches descending therefrom, and each of the plurality of images being assigned to at least one of the plurality of branches; and code to detect execution of a sequence control and to display at least one of the plurality of images based on the sequence control.

11. A computer-readable medium according to claim 10, wherein the code to display sequentially a plurality of images comprises:

code to determine whether the plurality of images are to be displayed in a default mode or in a sequence control mode; and code to display sequentially the plurality of images in a default mode in a case that it is determined that the plurality of images are to be displayed in a default mode.

12. A computer-readable medium according to claim 11, wherein the sequence control is a sequence of keystrokes.

13. A computer-readable medium according to claim 11, wherein the sequence control consists of moving a pointer to a location on a displayed image.

14. A graphical user interface, comprising:

means to create a presentation tree structure including elements that correspond to images of a multimedia presentation, the elements comprising a plurality of branches and at least one branch node, each branch being connected to a plurality of other branches by a branch node, each branch node having a plurality of branches descending therefrom;

means to assign at least one image of the plurality of images to each branch of the presentation tree structure; and means to define a sequence control for each of the plurality of branches descending from a branch node.

15. A graphical user interface according to claim 14, further comprising means to display a quick reference presentation flow tool illustrating each sequence control for each branch of the presentation tree.

16. A graphical user interface according to claim 15, further comprising means to print the quick reference presentation flow tool.

17. A computer-readable medium storing computer-executable program code of a graphical user interface, the code comprising:

code to create a presentation tree structure including elements that correspond to images of a multimedia presentation, the elements comprising a plurality of branches and at least one branch node, each branch being connected to a plurality of other branches by a branch node, each branch node having a plurality of branches descending therefrom;

code to assign at least one image of the plurality of images to each branch of the presentation tree structure; and code to define a sequence control for each of the plurality of branches descending from a branch node.

18. A computer-readable medium according to claim 17, the computer-executable program code further comprising code to display a quick reference presentation flow tool illustrating each sequence control for each branch of the presentation tree.

19. A computer-executable medium according to claim 18, the computer-executable program code further comprising code to print the quick reference presentation flow tool.

20. An apparatus for defining a presentation tree for displaying a plurality of images, the apparatus comprising:

a memory for storing computer executable process steps; and a processor for executing the process steps stored in said memory;

wherein said process steps include steps (1) to create a presentation tree structure including elements that correspond to images of a multimedia presentation, the elements comprising a plurality of branches and at least one branch node, each branch being connected to a plurality of other branches by a branch node, each branch node having a plurality of branches descending therefrom, (2) to assign at least one image of the plurality of images to each branch of the presentation tree structure, (3) to define a sequence control for each of the plurality of branches descending from a branch node, and wherein said defining step is performed for each branch node.

21. An apparatus according to claim 20, further comprising:

display means for displaying a quick reference presentation flow tool illustrating each sequence control for each branch of the presentation tree.

22. An apparatus according to claim 21, further comprising:

printing means for printing the quick reference presentation flow tool.

23. An apparatus for controlling presentation flow through a presentation tree including elements that correspond to images of a multimedia presentation, the elements comprising a plurality of branches and at least one branch node, each branch being connected to a plurality of other branches by a branch node, each branch node having a plurality of branches descending therefrom, and each branch having assigned thereto at least one presentation image, the apparatus comprising;

display means for displaying a multimedia presentation;

a memory for storing computer executable process steps; and a processor for executing the process steps stored in said memory;

wherein said process steps include a step (1) to execute a sequence control to select one of a plurality of branches descending from the branch node, and wherein the display means displays each presentation image assigned to one branch of the tree, the one branch connected to a branch node and displays each presentation image assigned to the selected one branch.

24. An apparatus according to claim 23, wherein, during the executing step, only a presentation image and a pointer are displayed.

25. An apparatus according to claim 23, wherein, during the executing step, only a presentation image is displayed.

26. An apparatus for creating a presentation sequence of a plurality of images comprising:

display means to display a graphical user interface;

a memory for storing computer executable process steps;

a processor for executing the process steps stored in said memory;

wherein said process steps include steps (1) to create a presentation tree including elements that correspond to images of a multimedia presentation, the elements comprising a plurality of branches and at least one branch node, each branch being connected to a plurality of other branches by a branch node, each branch node having a plurality of branches descending therefrom, (2) to assign at least one of the plurality of images to each of the plurality of branches, and (3) to assign a sequence control for each branch node.

27. An apparatus according to claim 26, wherein said process steps further include a step to receive user manipulations of the graphical user interface, said step to create the presentation tree being executed in response to the user manipulations.

28. An apparatus according to claim 27 wherein said graphical user interface comprises a means to define a sequence control for each of the plurality of branches descending from a branch node.

29. An apparatus according to claim 26, wherein the display means displays a quick reference presentation flow tool illustrating each sequence control for each branch of the presentation tree.

30. An apparatus according to claim 29, further comprising:

printing means for printing the quick reference presentation flow tool.

31. An apparatus for displaying a presentation sequence of a plurality of images comprising:

display means to display images of a multimedia presentation;

a memory for storing computer executable process steps;

a processor for executing the process steps stored in said memory;

wherein said process steps include steps (1) to receive a command to initiate a presentation sequence, (2) to display sequentially a plurality of images in accordance with a presentation tree including elements that correspond to images of a multimedia presentation, the elements comprising a plurality of branches and at least one branch node, each branch being connected to a plurality of other branches by a branch node, each branch node having a plurality of branches descending therefrom, and each of the plurality of images being assigned to at least one of the plurality of branches, and (3) to detect execution of a sequence control and to display at least one of the plurality of images based on the sequence control.

32. An apparatus according to claim 31, wherein the step to display sequentially a plurality of images comprises steps (1) to determine whether the plurality of images are to be displayed in a default mode or in a sequence control mode, (2) to display sequentially the plurality of images in a default mode in a case that it is determined that the plurality of images are to be displayed in a default mode, and (3) to detect execution of a sequence control in a case that it is determined that the plurality of images are to be displayed in a sequence control mode.

33. An apparatus according to claim 32, wherein the sequence control is a sequence of keystrokes.

34. An apparatus according to claim 32, wherein the sequence control consists of moving a pointer to a location on a displayed image.

\* \* \* \* \*

UNITED STATES PATENT AND TRADEMARK OFFICE
CERTIFICATE OF CORRECTION

PATENT NO. : 6,157,364
DATED : December 5, 2000
INVENTOR(S) : Timothy L. Kohler

Page 1 of 1

It is certified that error appears in the above-identified patent and that said Letters Patent is hereby corrected as shown below:

Column 1,
Line 49, "realizes;" should read -- realizes --.

Column 6,
Line 41, "brarch" should read -- branch --.

Column 10,
Line 39, "Likely" should read -- likely --.

Column 11,
Line 26, "consider" should read -- considered --.
Line 30, "includes" should read -- included --.

Signed and Sealed this

Thirtieth Day of October, 2001

*Attest:*

NICHOLAS P. GODICI
*Attesting Officer*    Acting Director of the United States Patent and Trademark Office